(12) United States Patent
Liang et al.

(10) Patent No.: US 12,593,337 B2
(45) Date of Patent: Mar. 31, 2026

(54) RESOURCE DETERMINATION METHOD AND APPARATUS, DEVICES, AND STORAGE MEDIUM

(71) Applicant: GUANGDONG OPPO MOBILE TELECOMMUNICATIONS CORP., LTD., Dongguan (CN)

(72) Inventors: Bin Liang, Dongguan (CN); Jing Xu, Dongguan (CN); Yanan Lin, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 315 days.

(21) Appl. No.: 18/348,168

(22) Filed: Jul. 6, 2023

(65) Prior Publication Data

US 2023/0354344 A1 Nov. 2, 2023

Related U.S. Application Data

(63) Continuation of application No. PCT/CN2021/071887, filed on Jan. 14, 2021.

(51) Int. Cl.
*H04W 72/21* (2023.01)
*H04W 72/52* (2023.01)
*H04W 72/563* (2023.01)

(52) U.S. Cl.
CPC ........... *H04W 72/21* (2023.01); *H04W 72/52* (2023.01); *H04W 72/563* (2023.01)

(58) Field of Classification Search
CPC ... H04W 72/21; H04W 72/52; H04W 72/563; H04L 5/0053; H04L 5/0064; H04L 5/0091; H04L 5/0044
See application file for complete search history.

(56) References Cited

U.S. PATENT DOCUMENTS 11,234,260 B2 * 1/2022 Li .......................... H04W 72/21
11,463,210 B2 * 10/2022 Akkarakaran .... H04L 27/26136
(Continued)

FOREIGN PATENT DOCUMENTS

CN 109302272 2/2019
CN 110971339 4/2020
(Continued)

OTHER PUBLICATIONS

OPPO, "Enhancements on intra-UE multiplexing/prioritization," 3GPP TSG RAN WG1 #103-e, R1-2008282, Oct. 2020.
(Continued)

*Primary Examiner* — Khaled M Kassim
*Assistant Examiner* — Christopher A. Reyes
(74) *Attorney, Agent, or Firm* — Hodgson Russ LLP

(57) ABSTRACT

Disclosed are a resource determination method and apparatus, devices, and a storage medium, which relate to the field of mobile communications. The method comprises: according to first uplink control information and/or second uplink control information, which are/is to be sent, determining a first resource, wherein the first resource is used for transmitting the first uplink control information and the second uplink control information, and the priority of the first uplink control information is different from that of the second uplink control information; and sending, on the first resource, the first uplink control information and the second uplink control information to a network device.

8 Claims, 4 Drawing Sheets

(56) References Cited

U.S. PATENT DOCUMENTS

| | | | | |
|---|---|---|---|---|
| 12,279,296 | B2 * | 4/2025 | Lee | H04L 5/0094 |
| 2014/0036840 | A1 * | 2/2014 | Yang | H04L 27/2636 |
| | | | | 370/329 |
| 2016/0174214 | A1 * | 6/2016 | Yerramalli | H04W 76/27 |
| | | | | 370/329 |
| 2018/0167933 | A1 * | 6/2018 | Yin | H04L 5/0055 |
| 2018/0324777 | A1 * | 11/2018 | Wang | H04B 1/713 |
| 2019/0013982 | A1 * | 1/2019 | Sun | H04W 72/20 |
| 2020/0120706 | A1 * | 4/2020 | Sun | H04L 5/0007 |
| 2020/0287694 | A1 * | 9/2020 | Papasakellariou | H04L 5/0057 |
| 2021/0014854 | A1 * | 1/2021 | Gao | H04L 1/1861 |
| 2021/0022130 | A1 * | 1/2021 | Gao | H04L 5/0057 |
| 2021/0105764 | A1 * | 4/2021 | Datta | H04L 5/0016 |
| 2021/0105812 | A1 * | 4/2021 | Rastegardoost | H04L 1/1671 |
| 2021/0176028 | A1 * | 6/2021 | Zhou | H04W 72/23 |
| 2021/0392637 | A1 * | 12/2021 | Gao | H04L 5/0055 |
| 2022/0394704 | A1 * | 12/2022 | Zhao | H04W 72/569 |
| 2023/0354344 | A1 * | 11/2023 | Liang | H04W 72/21 |
| 2023/0389010 | A1 * | 11/2023 | Guo | H04W 72/56 |

FOREIGN PATENT DOCUMENTS

| | | |
|---|---|---|
| CN | 111345083 | 6/2020 |
| WO | 2019192471 | 10/2019 |

OTHER PUBLICATIONS

Interdigital Inc., "Inter-UE prioritization/multiplexing," 3GPP TSG RAN WG1 #101, R1-2004272, May 2020.

WIPO, International Search Report and Written Opinion for PCT/CN2021/071887, Sep. 28, 2021.

OPPO, "Summary#1 on Intra-UE Multiplexing/Prioritization for R17," GPP TSG RAN WG1 #103-e, R1-2009045, Oct. 2020.

OPPO, "Summary#1 of email thread [103-e-NR-IIOT_URLLC_enh-04]," 3GPP TSG RAN WG1 #102-e, R1-2009546, Aug. 2020.

LG Electronics, "Discussion on Intra-UE multiplexing/prioritization," 3GPP TSG RAN WG1 #103-e, R1-2008060, Oct. 2020.

EPO, Extended European Search Report for EP Application No. 21918444.7, Dec. 22, 2023.

* cited by examiner

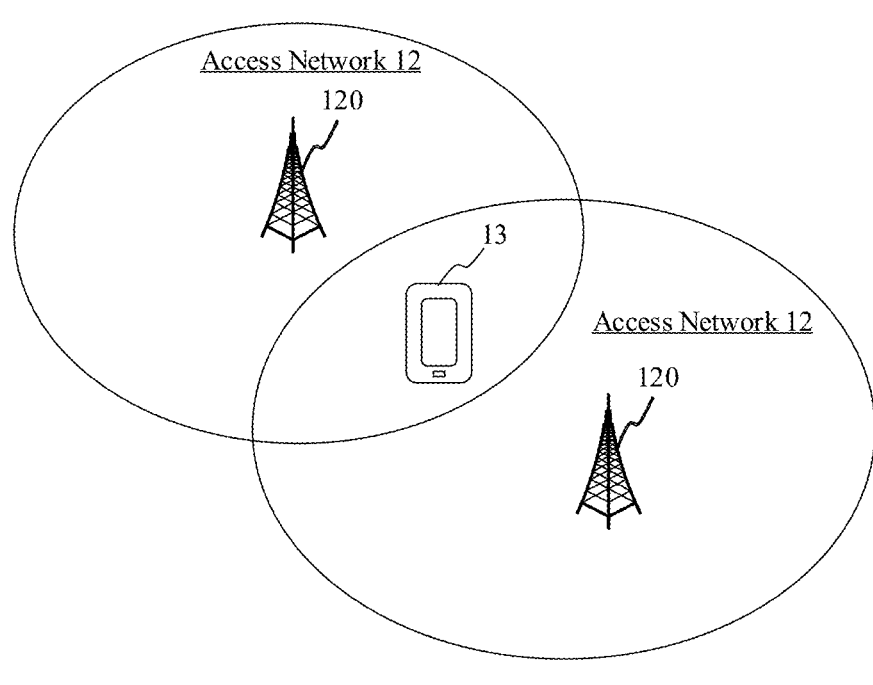

FIG. 1

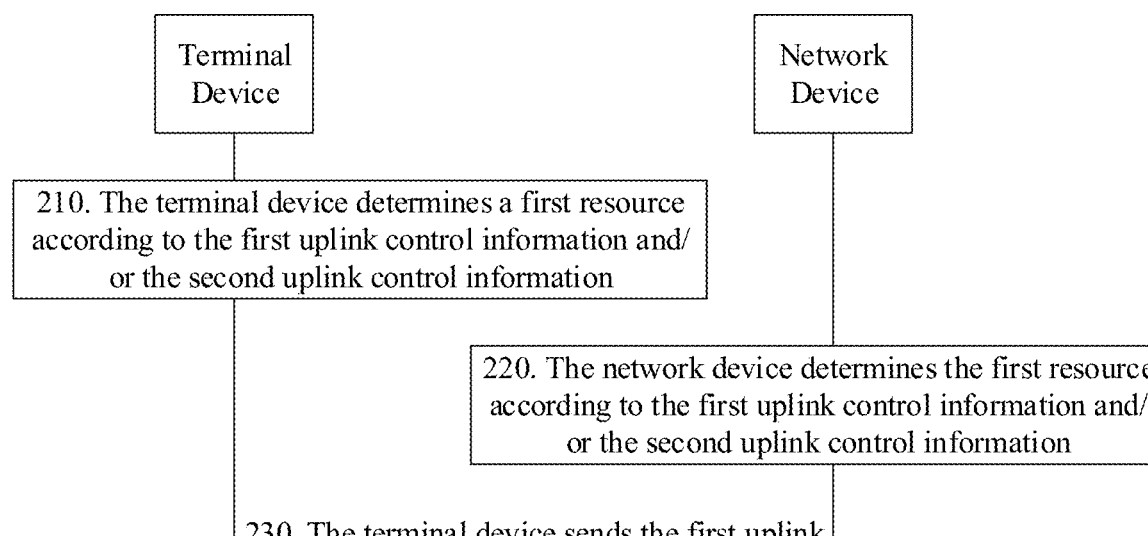

210. The terminal device determines a first resource according to the first uplink control information and/or the second uplink control information 220. The network device determines the first resource according to the first uplink control information and/or the second uplink control information 230. The terminal device sends the first uplink control information and the second uplink control information on the first resource 240. The network device receives the first uplink control information and the second uplink control information on the first resource

FIG. 2

RESOURCE DETERMINATION METHOD AND APPARATUS, DEVICES, AND STORAGE MEDIUM

CROSS REFERENCE

The present application is a continuation of International Application No. PCT/CN2021/071887, filed Jan. 14, 2021, the entire disclosure of which is incorporated herein by reference.

TECHNICAL FIELD

The present disclosure relates to the field of mobile communications, and in particular to a resource determination method, apparatus, device and storage medium.

BACKGROUND

With the rapid development of mobile communication technology, terminal device and network device usually interact to realize service transmission. Since terminal device can support the transmission of different services at the same time, it needs to interact with network device based on different services.

If the terminal device needs to complete different service transmissions with the network device at the same time, it will send the first uplink control information and the second uplink control information to the network device. Before that, firstly the first resource used to transmit the first uplink control information and the second resource used to transmit the second uplink control information are determined, the first uplink control information is transmitted on the first resource, and the second uplink control information is transmitted on the second resource.

SUMMARY

The embodiment of the present application provides a resource determination method, apparatus, device, and storage medium. Described technical scheme is as follows:

According to one aspect of the present application, a resource determination method is provided, which is applied to a terminal device, and the method includes:

determining a first resource according to first uplink control information and/or second uplink control information, wherein a priority of the first uplink control information is different from a priority of the second uplink control information; and sending the first uplink control information and the second uplink control information on the first resource.

According to one aspect of the present application, a resource determination method is provided, which is applied to a network device, and the method includes:

determining a first resource according to first uplink control information and/or second uplink control information, wherein a priority of the first uplink control information is different from a priority of the second uplink control information; and receiving the first uplink control information and the second uplink control information on the first resource.

According to one aspect of the present application, an apparatus for determining resources is provided, which is configured in a terminal device, and the apparatus includes:

a determining module, configured to determine a first resource according to first uplink control information and/or second uplink control information, wherein a priority of the first uplink control information is different from a priority of the second uplink control information; and a sending module, configured to send the first uplink control information and the second uplink control information on the first resource.

According to one aspect of the present application, an apparatus for determining resources is provided, which is configured in a network device, and the apparatus includes:

a determining module, configured to determine a first resource according to first uplink control information and/or second uplink control information, wherein a priority of the first uplink control information is different from a priority of the second uplink control information; and a receiving module, configured to receive the first uplink control information and the second uplink control information on the first resource.

According to one aspect of the present application, a terminal device is provided, and the terminal device includes: a processor; a transceiver connected to the processor; a memory for storing executable instructions of the processor; wherein, the processor is configured to load and execute the executable instructions to implement the method for determining resources as described in the above aspect.

According to one aspect of the present application, a network device is provided, and the network device includes: a processor; a transceiver connected to the processor; a memory for storing executable instructions of the processor; wherein, the processor is configured to load and execute the executable instructions to implement the method for determining resources as described in the above aspect.

According to one aspect of the present application, a computer-readable storage medium is provided, wherein an executable program code is stored in the readable storage medium, and the executable program code is loaded and executed by a processor to implement the method for determining resources as described in the above aspect.

According to one aspect of the present application, a chip is provided, the chip includes a programmable logic circuit and/or program instructions, and when the chip is run on a terminal device or a network device, it is used to implement the method for determining resources as described in the above aspect.

According to one aspect of the present application, an embodiment of the present application provides a computer program product, which is used to implement the method for determining resources described in the above aspect when the computer program product is executed by a processor of a terminal device or a network device.

BRIEF DESCRIPTION OF THE DRAWINGS

In order to more clearly illustrate the technical solutions in the embodiments of the present application, the drawings that need to be used in the description of the embodiments will be briefly introduced below. Obviously, the drawings in the following description are only some embodiments of the present application. For those skilled in the art, other drawings can also be obtained based on these drawings without creative effort.

FIG. 1 shows a block diagram of a communication system provided by an exemplary embodiment of the present application.

FIG. 2 shows a flowchart of a resource determination method provided by an exemplary embodiment of the present application.

DETAILED DESCRIPTION

Figure 3:
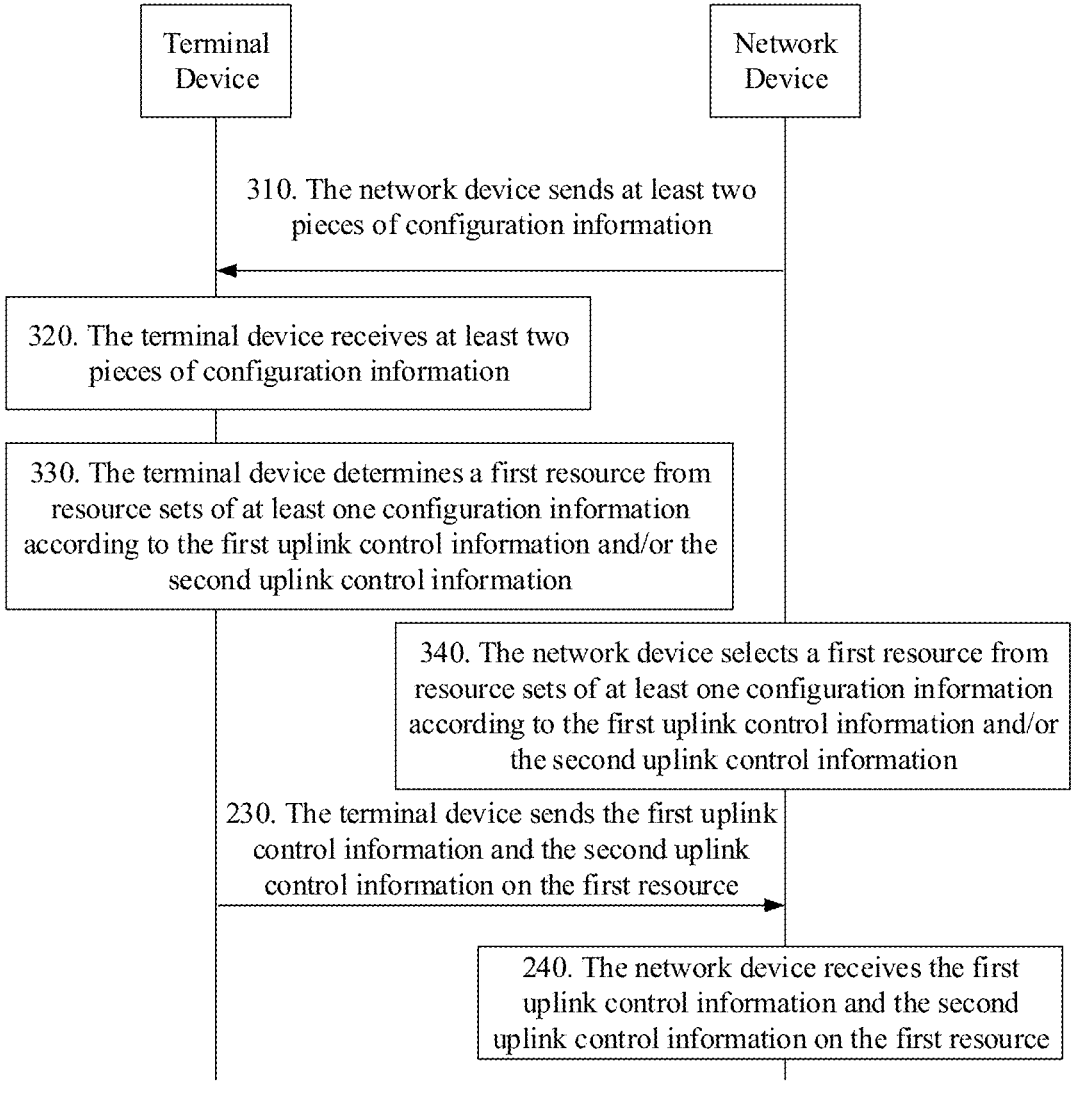
FIG. 3 shows a flowchart of a resource determination method provided by an exemplary embodiment of the present application.

In order to make the purpose, technical solution and advantages of the present application clearer, the implementation manners of the present application will be further described in detail below in conjunction with the accompanying drawings.

First of all, the application scenario of this application is explained first.

FIG. 1 shows a block diagram of a communication system provided by an exemplary embodiment of the present application. The communication system may include: an access network 12 and a terminal 13.

The access network 12 includes several network devices 120. The network device 120 may be a base station, and the base station is a device deployed in an access network to provide a wireless communication function for a terminal. The base station may include various forms of macro base stations, micro base stations, relay stations, access points and so on. In systems using different wireless access technologies, the names of devices with base station functions may be different. For example, in LTE systems, they are called eNodeB or eNB; in 5G NR-U systems, they are called gNodeB or gNB. As communications technology evolves, the description of "base station" may change. For convenience in this embodiment of the present application, the above-mentioned devices that provide wireless communication functions for the terminal 13 are collectively referred to as access network devices.

The terminal 13 may include various handheld devices, vehicle-mounted devices, wearable devices, computing devices or other processing devices connected to wireless modems, as well as various forms of user equipment, mobile stations (MS), Terminal (terminal device) and so on, which have wireless communication functions. For convenience of description, the devices mentioned above are collectively referred to as the terminal. The access network device 120 and the terminal 13 communicate with each other through a certain air interface technology, such as a Uu interface.

The technical solutions of the embodiments of the present application can be applied to various communication systems, such as: Global System of Mobile Communication (GSM) system, Code Division Multiple Access (CDMA) system, Wideband Code Division Multiple Access (WCDMA) system, General Packet Radio Service (General Packet Radio Service, GPRS), Long Term Evolution (LTE) system, LTE Frequency Division Duplex (FDD) system, LTE Time Division Duplex (TDD) system, Advanced Long Term Evolution (LTE-A) system, New Radio (NR) system, evolution system of NR system, LTE-based access to Unlicensed spectrum (LTE-U) system, NR-U system, Universal Mobile Telecommunication System (UMTS), Worldwide Interoperability for Microwave Access (WiMAX) communication system, Wireless Local Area Networks (WLAN), Wireless Fidelity (WiFi), next generation communication system or other communication systems, etc.

Generally speaking, the number of connections supported by traditional communication systems is limited and easy to implement. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication and Vehicle to Everything (V2X) system, etc. The embodiments of the present application may also be applied to these communication systems.

FIG. 2 shows a flowchart of a resource determination method provided by an exemplary embodiment of the present application, which is applied to the terminal device and network device shown in FIG. 1, and the method includes at least some of the following contents:

210. The terminal device determines a first resource according to the first uplink control information and/or the second uplink control information.

In the embodiment of the present application, communication can be performed between the terminal device and the network device. If during the communication process, the terminal device needs to send the first uplink control information and/or the second uplink control information to the network device, and the configured time domain resource for transmission of the first uplink control information is overlapped with the resource for transmission of the second uplink control information, then only one uplink control information can be transmitted at this time, so it needs to determine the first resource according to the first uplink control information and/or the second uplink control information, and then the first uplink control information and the second uplink control information are transmitted on the first resource.

In the embodiment, the priorities of the first uplink control information and the second uplink control information are different. In the embodiment of the present application, when the terminal device needs to send the first uplink control information and the second uplink control information, since the first uplink control information and the second uplink control information belong to different services, and different services correspond to different priorities, as a result, priorities for sending the first uplink control information and the second uplink control information are different.

In the embodiment, the first uplink control information and the second uplink control information may be HARQ (Hybrid Automatic Repeat reQuest) ACK (Acknowledgment), CSI (Channel State Information), RI (RANK Indication information), SR (scheduling request).

220. The network device determines the first resource according to the first uplink control information and/or the second uplink control information.

Like the step 210 above, since the terminal device needs to send the first uplink control information and the second uplink control information to the network device, the network device also needs to determine the first resource according to the first uplink control information and/or the second uplink control information.

It should be noted that the present application does not limit the execution sequence of steps 210-220, and step 210 may be executed before step 220, or may be executed after step 220.

230. The terminal device sends the first uplink control information and the second uplink control information on the first resource.

After determining the first resource, the terminal device sends the first uplink control information and the second uplink control information to the network device on the first resource.

240. The network device receives the first uplink control information and the second uplink control information on the first resource.

After the terminal device sends the first uplink control information and the second uplink control information, the network device also receives the first uplink control information and the second uplink control information on the first resource.

In the method provided in the embodiment of the present application, the first resource used to transmit the first uplink control information and the second uplink control information with different priorities is determined, and then the first uplink control information and the second uplink control information are transmitted on the first resource. It breaks the limitation that two uplink control information cannot be transmitted when the time domain resources for transmitting the two uplink control information overlap, prevents the loss of services, improves the effect of transmitting uplink control information, and further improves the communication quality.

On the basis of the embodiment shown in FIG. 2, FIG. 3 shows a flow chart of a resource determination method provided by an exemplary embodiment of the present application, which is applied to the terminal device and network device as shown in FIG. 1, the method includes at least some of the following:

310. The network device sends at least two pieces of configuration information.

320. The terminal device receives at least two pieces of configuration information.

In the embodiment of this application, the network device will pre-configure at least two configuration information, each configuration information is used to configure at least one resource set, each resource set includes at least one resource, and the at least two configuration information correspond to different physical layer priorities.

For example, if the network device sends two configuration information to the terminal device, the physical layer priority corresponding to one configuration information is higher than the physical layer priority corresponding to the other configuration information, and when two uplink control information needs to be transmitted, the uplink control information with high priority determines resources from the configuration information with high priority, and the uplink control information with low priority determines resources from the configuration information with low priority.

Steps 210-220 are replaced with 330-340:

330. The terminal device determines a first resource from resource sets configured by the at least two configuration information according to the first uplink control information and/or the second uplink control information.

After determining the first uplink control information and/or the second uplink control information, the terminal device may determine the first resource from the resource sets configured by the at least two configuration information.

For example, the terminal device determines the first resource from a resource set configured by any piece of configuration information in the configuration information. Alternatively, the terminal device determines the first resource from the resource sets configured by a plurality of configuration information.

In some embodiments, according to the first uplink control information and/or the second uplink control information, the first resource set is determined from the resource sets of the at least two configuration information, and the resource corresponding to the first uplink indication information in the first resource set is determined as the first resource.

In the embodiment, the first uplink indication information is an index identifier. For example, the first uplink indication information is 1, 2, 3 or other numerical values. For example, if the first resource set includes 4 resources, and the first uplink indication information is 2, then the second one resource in the first resource set is determined as the first resource.

In some embodiments, the first uplink control information has corresponding uplink indication information, the second uplink control information has corresponding uplink indication information, and the uplink indication information of the first uplink control information or the second uplink control information is determined as the first uplink indication information. In the embodiment, the first uplink indication information includes any of the following situations:

(1) The first uplink indication information is uplink indication information corresponding to the first uplink control information.

(2) The first uplink indication information is uplink indication information corresponding to the second uplink control information.

(3) The first uplink indication information is the uplink indication information corresponding to the uplink control information with the highest priority among the first uplink control information and the second uplink control information.

In the embodiment of the present application, both the first uplink indication information and the second uplink indication information are used to indicate the resources for transmitting uplink control information. Since the uplink control information has a priority, it also means that the first uplink indication information and the second uplink indication information have the same priority as the priority of the uplink control information that is indicated for transmission.

(4) The first uplink indication information is the uplink indication information corresponding to the uplink control information with the lowest priority among the first uplink control information and the second uplink control information.

(5) The first uplink indication information is the earliest uplink indication information among the uplink indication information respectively corresponding to the first uplink control information and the second uplink control information.

In the embodiment of the present application, since the sending time of the first uplink indication information and the second uplink indication information are different, the time for the terminal device to receive the first uplink indication information and the second uplink indication information is also different, and the terminal device determines the first uplink indication information according to the receiving time of the first uplink indication information and the second uplink indication information.

(6) The first uplink indication information is the latest uplink indication information among the uplink indication information respectively corresponding to the first uplink control information and the second uplink control information.

It should be noted that the uplink indication information mentioned in the embodiment of the present application is an index identifier, and the index identifier can also index resources in any resource set, and is not limited to only index resources in a specific resource set.

In addition, the first uplink indication information and the second uplink indication information are included in DCI (DownlinkControlInformation), or, the first uplink indication information and the second uplink indication information are included in RRC (Radio Resource Control) information.

Next, three schemes of determining the first resource set will be described:

Scheme one: according to the first load corresponding to the first uplink control information, the first resource set is determined from the resource sets configured by the configuration information corresponding to the first uplink control information.

In the embodiment, the first load is the number of bits of the first uplink control information.

In the embodiment of the present application, the resource set configured by the configuration information corresponds to a bit number range, which also indicates that different resource sets correspond to different bit number ranges. Then, according to the first load corresponding to the first uplink control information, the terminal device determines from the resource sets configured by the configuration information corresponding to the first uplink control information the resource set to which the bit number range where the first load is located belongs, and determines the determined resource set as the first resource set.

Figure 4:
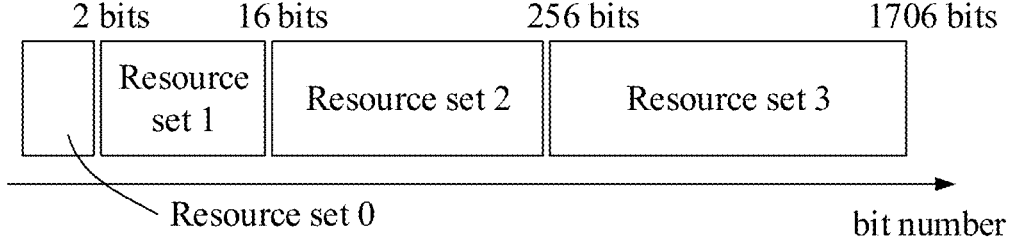
FIG. 4 shows a schematic diagram of the number of bits corresponding to a resource set provided by an exemplary embodiment of the present application.

For example, as shown in FIG. 4, the configuration information corresponding to the first uplink control information configures 4 resource sets, and the ranges of bits corresponding to the 4 resource sets are sequentially (1, 2), (3 . . . 16), (17 . . . 256), and (257 . . . 1706), if the number of bits of the first uplink control information is 15, it is determined that it belongs to the interval (3 . . . 16), and the resource set corresponding to (3 . . . 16) is determined as the first resource set.

Scheme two: according to the second load corresponding to the second uplink control information, the first resource set is determined from the resource sets configured by the configuration information corresponding to the second uplink control information.

In the embodiment, the second load is the number of bits of the second uplink control information.

In the embodiment of the present application, the resource set configured by the configuration information corresponds to a bit number range, which also indicates that different resource sets correspond to different bit number ranges. Then, according to the second load corresponding to the second uplink control information, the terminal device determines from the resource sets configured by the configuration information corresponding to the second uplink control information the resource set to which the bit number range where the second load is located belongs, and determines the determined resource set as the first resource set.

Figure 5:
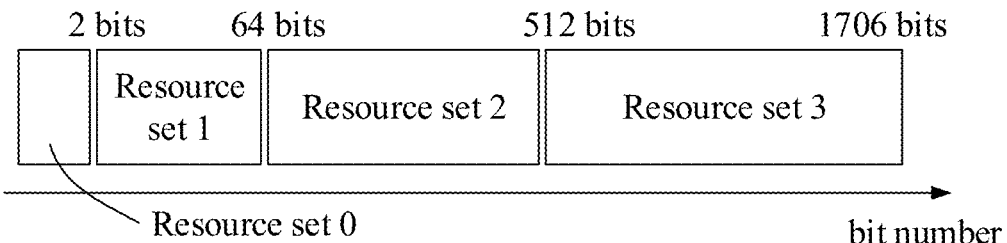
FIG. 5 shows a schematic diagram of the number of bits corresponding to a resource set provided by an exemplary embodiment of the present application.

For example, as shown in FIG. 5, the configuration information corresponding to the second uplink control information includes 4 resource sets, and the ranges of bits corresponding to the 4 resource sets are sequentially (1, 2), (3 . . . 64), (65 . . . 512), and (513 . . . 1706), if the number of bits of the second uplink control information is 15, it is determined that it belongs to the interval (3 . . . 64), and the resource set corresponding to (3 . . . 64) is determined as the first resource set.

Scheme three: according to the first load and the first code rate corresponding to the first uplink control information, and the second load and the second code rate corresponding to the second uplink control information, the first resource set is determined from resource sets configured by at least two configuration information In this embodiment of the present application, the terminal device needs to consider not only the load corresponding to the uplink control information, but also the code rate corresponding to the uplink control information, and then determine the first resource set from the resource set of at least one configuration information.

In some embodiments, a third load is determined according to at least one of the first uplink control information, the second uplink control information, the first load, the first code rate, the second load, and the second code rate, and according to the third load, the first resource set is determined from resource sets configured by the at least two configuration information.

In the embodiment of the present application, since the first uplink control information and the second uplink control information need to be transmitted on the determined first resource, in the process of determining the first resource, the number of bits of the first uplink control information and the number of bits of the second uplink control information need to be considered at the same time, then after the third load is determined, as the third load represents the comprehensive consideration of the number of bits of the first uplink control information and the second uplink control information, and then the first resource set is determined according to the third load, and the first resource used to transmit the first uplink control information and the second uplink control information is determined from the first resource set.

In a possible implementation manner, the third load is determined according to a product of a third code rate and a sum of a first ratio and a second ratio.

In the embodiment, the first ratio is a ratio of the first load to the first code rate. The second ratio is a ratio of the second load to the second code rate.

In some embodiments, the first code rate is the code rate at which the terminal device encodes the first uplink control information, and the obtained first ratio can be understood as the bit number after the terminal device encodes the first uplink control information according to the first code rate. The second code rate is the code rate for the terminal device to encode the second uplink control information, and the obtained second ratio can be understood as the number of bits after the terminal device encodes the second uplink control information according to the second code rate.

For example, in this embodiment of the application, the number of bits corresponding to the resource set configured by the first configuration information is shown in FIG. 4, and the number of bits corresponding to the resource set configured by the second configuration information is shown in FIG. 5, and the Table 1 shows the code rates corresponding to the resource set configured by the first configuration information and the second configuration information.

TABLE 1

|  |  | resource set 0 | Resource set 1 | Resource set 2 | Resource set 3 |
|---|---|---|---|---|---|
| first configuration information | bit range | (1, 2) | (3 ... 16) | (17 ... 256) | (257 ... 1706) |
|  | code rate | none | 0.2, 0.5, 0.8 | 0.2, 0.5 | 0.4, 0.5, 0.9 |
| second configuration information | bit range | (1, 2) | (3 ... 64) | (65 ... 512) | (513 ... 1706) |
|  | code rate | none | 0.4, 0.5 | 0.5, 0.8 | 0.8, 0.9 |

Referring to Table 1, the third code rate, the first code rate, and the second code rate can be determined respectively according to the following methods of determining the third code rate, the first code rate, and the second code rate, and then continue to determine the third load according to the determined third code rate, first code rate, second code rate, first load and second load.

In some other embodiments, according to the third load, determining the first resource set from the resource sets configured by the at least two configuration information includes any of the following:

(1) The first resource set is a resource set corresponding to the third load among the resource sets configured by the configuration information corresponding to the first uplink control information.

(2) The first resource set is a resource set corresponding to the third load among the resource sets configured by the configuration information corresponding to the second uplink control information.

(3) The first resource set is a resource set corresponding to the third load among the resource sets configured by configuration information with the highest priority.

(4) The first resource set is a resource set corresponding to the third load among the resource sets configured by configuration information with the lowest priority.

In the embodiment, since the uplink control information has a priority in transmission, and the resources in the resource set configured by the configuration information are all used to transmit the uplink control information, the resources in the resource set configured by different configuration information are used to transmit the uplink control information with different priorities, therefore, the priority corresponding to the configuration information is the same as that of the transmitted uplink control information, and different configuration information corresponds to different priorities.

In this embodiment of the present application, after the third load is determined through the above process, the third load is also used to indicate the number of bits of the uplink control information, and the terminal device determines the first resource set from the resource sets configured by the configuration information according to the determined third load.

In addition, the manner of determining the first resource set according to the third load is similar to the above-mentioned manner of determining the first resource set according to the first load, which will not be repeated here.

It should be noted that the third code rate is determined according to at least one of the first uplink control information, the second uplink control information, the first load, the first code rate, the second load, and the second code rate, and the schemes for determining the third code rate is described hereinafter. The third code rate can is determined in the following schemes:

Scheme one: the third code rate is determined by the first code rate and the second code rate.

(1) The third code rate is the smallest code rate among the first code rate and the second code rate.

For example, if the first code rate is 0.5 and the second code rate is 0.8, the third code rate is determined to be 0.5.

(2) The third code rate is the largest code rate among the first code rate and the second code rate.

(3) The third code rate is the code rate corresponding to the uplink control information with the highest priority.

In this embodiment of the application, since the first uplink control information corresponds to a code rate, the second uplink control information corresponds to a code rate, and both the first uplink control information and the second uplink control information have corresponding priorities, then when determining the third code rate, the code rate corresponding to the uplink control information with the highest priority is determined as the third code rate.

For example, the priority of the first uplink control information is higher than the priority of the second uplink control information, then the third code rate is the first code rate corresponding to the first uplink control information.

(4) The third code rate is the code rate corresponding to the uplink control information with the lowest priority.

Scheme two: the third code rate is determined by the first uplink control information.

(1) The third code rate is the code rate corresponding to the resource corresponding to the second uplink indication information in the resource set corresponding to the first load, and the second uplink indication information is the indication information corresponding to the first uplink control information.

In this embodiment of the present application, each resource set includes at least one resource, and the code rate corresponding to each resource is different. When determining the third code rate, the code rate corresponding to the resource corresponding to the second uplink indication information in the resource set corresponding to the first load can be determined as the third code rate.

(2) The third code rate is the maximum code rate corresponding to the resources in the resource set configured by the configuration information corresponding to the first uplink control information.

For example, the first uplink control information corresponds to the first one piece of configuration information in Table 1, the resources included in the first configuration information correspond to a maximum code rate of 0.9, and the third code rate is determined to be 0.9.

(3) The third code rate is the minimum code rate corresponding to the resources in the resource set configured by the configuration information corresponding to the first uplink control information.

For example, the first uplink control information corresponds to the first one piece of configuration information in Table 1, the resources included in the first configuration information correspond to a minimum code rate of 0.2, and the third code rate is determined to be 0.2.

(4) The third code rate is the maximum code rate corresponding to the resources in the resource set corresponding to the first load.

For example, if the first load is 15, it is determined that the code rates corresponding to the resources in the resource set corresponding to the first load include 0.2, 0.5, and 0.8, the maximum code rate is 0.8, and the third code rate is determined to be 0.8.

(5) The third code rate is the minimum code rate corresponding to the resources in the resource set corresponding to the first load.

For example, if the first load is 15, it is determined that the code rates corresponding to the resources in the resource set corresponding to the first load include 0.2, 0.5, and 0.8, the minimum code rate is 0.2, and the third code rate is determined to be 0.2.

It should be noted that the resource set corresponding to the first load in the second scheme is a resource set configured by configuration information corresponding to the first uplink control information.

In this embodiment of the present application, the first load is the load corresponding to the first uplink control information, and the configuration information corresponding to the first uplink control information is configured with at least one resource set, and then the third code rate is determined according to the code rate corresponding to the resources in the at least one resource set configured by the configuration information.

Scheme three: the third code rate is determined by the second uplink control information.

(1) The third code rate is the code rate corresponding to the resource corresponding to the third uplink indication information in the resource set corresponding to the second load, and the third uplink indication information is the indication information corresponding to the second uplink control information.

(2) The third code rate is the maximum code rate corresponding to the resources in the resource set configured by the configuration information corresponding to the second uplink control information.

(3) The third code rate is the minimum code rate corresponding to the resources in the resource set configured by the configuration information corresponding to the second uplink control information.

(4) The third code rate is the maximum code rate corresponding to the resources in the resource set corresponding to the second load.

(5) The third code rate is the minimum code rate corresponding to the resources in the resource set corresponding to the second load.

It should be noted that, in the fourth manner, the resource set corresponding to the second load is a resource set configured by configuration information corresponding to the second uplink control information.

In the embodiment, the process of determining the third code rate according to the code rate corresponding to the resource in the configuration information corresponding to the second uplink control information is similar to the above-mentioned process of determining the third code rate according to the code rate corresponding to the resource in the configuration information corresponding to the first uplink control information, which will not be repeated here.

Scheme four: the third code rate is determined by the priority corresponding to the configuration information.

(1) The third code rate is the maximum code rate corresponding to the resources in the resource set configured by the configuration information with the highest priority.

In the above embodiments, it has been explained that the configuration information corresponds to a priority, and the resources in the resource set configured by the configuration information correspond to a code rate. The third code rate is determined according to the magnitude relationship between the code rates corresponding to the resources in the resource set configured by the configuration information.

For example, the priority of the first configuration information shown in Table 1 is higher than that of the second configuration information, then the third code rate is 0.9, which is the maximum code rate corresponding to the resource in the first configuration information.

(2) The third code rate is the minimum code rate corresponding to the resources in the resource set configured by the configuration information with the highest priority.

For example, the priority of the first configuration information shown in Table 1 is higher than that of the second configuration information, then the third code rate is 0.2, which is the minimum code rate corresponding to the resource in the first configuration information.

(3) The third code rate is the maximum code rate corresponding to the resources in the resource set configured by the configuration information with the lowest priority.

For example, the priority of the first configuration information shown in Table 1 is higher than that of the second configuration information, then the third code rate is 0.9, which is the maximum code rate corresponding to the resource in the second configuration information.

(4) The third code rate is the minimum code rate corresponding to the resources in the resource set configured by the configuration information with the lowest priority.

For example, the priority of the first configuration information shown in Table 1 is higher than that of the second configuration information, then the third code rate is 0.4, which is the minimum code rate corresponding to the resources in the second configuration information.

It should be noted that in the embodiment of the present application, the first code rate of the first uplink control information and the second code rate of the second uplink control information will also be used. How to determine the first code rate of the first uplink control information and the second code rate of the second uplink control information will be discussed below:

In the embodiment, the first code rate of the first uplink control information is any of the following situations:

(1) The first code rate is the code rate corresponding to the resource corresponding to the second uplink indication information in the resource set corresponding to the first load, and the second uplink indication information is the indication information corresponding to the first uplink control information.

(2) The first code rate is the maximum code rate corresponding to the resources in the resource set configured by the configuration information corresponding to the first uplink control information.

(3) The first code rate is the minimum code rate corresponding to the resources in the resource set configured by the configuration information corresponding to the first uplink control information.

(4) The first code rate is the maximum code rate corresponding to the resources in the resource set configured for the resource set corresponding to the first load.

(5) The first code rate is the minimum code rate corresponding to the resources in the resource set configured for the resource set corresponding to the first load.

It should be noted that the resource set corresponding to the first load is a resource set configured by configuration information corresponding to the first uplink control information. In addition, the manner of determining the first code rate is similar to the above-mentioned second scheme for determining the third code rate, which will not be repeated here.

In some embodiments, the second code rate of the second uplink control information is any of the following:

(1) The second code rate is the code rate corresponding to the resource corresponding to the third uplink indication information in the resource set corresponding to the second load, and the third uplink indication information is the indication information corresponding to the second uplink control information.

(2) The second code rate is the maximum code rate corresponding to the resources in the resource set configured by the configuration information corresponding to the second uplink control information.

(3) The second code rate is the minimum code rate corresponding to the resources in the resource set configured by the configuration information corresponding to the second uplink control information.

(4) The second code rate is the maximum code rate corresponding to the resources in the resource set corresponding to the second load.

(5) The second code rate is the minimum code rate corresponding to the resources in the resource set corresponding to the second load.

It should be noted that the resource set corresponding to the second load is a resource set configured by configuration information corresponding to the second uplink control information. In addition, the manner of determining the second code rate is similar to the above-mentioned third scheme of determining the third code rate, which will not be repeated here.

340. The network device selects a first resource from resource sets configured by at least two configuration information according to the first uplink control information and/or the second uplink control information.

In some embodiments, the network device determines the first resource set from the resource sets configured by the at least two configuration information according to the first uplink control information and/or the second uplink control information, and determines the resource corresponding to the first uplink indication information in the first resource set as the first resource.

In some embodiments, the first uplink control information has corresponding uplink indication information, and the second uplink control information has corresponding uplink indication information, then the uplink indication information of the first uplink control information or the second uplink control information can be determined as the first uplink instruction information. In the embodiment, the first uplink indication information includes any of the following situations:

(1) The first uplink indication information is uplink indication information corresponding to the first uplink control information.

(2) The first uplink indication information is uplink indication information corresponding to the second uplink control information.

(3) The first uplink indication information is the uplink indication information corresponding to the uplink control information with the highest priority among the first uplink control information and the second uplink control information.

(4) The first uplink indication information is the uplink indication information corresponding to the uplink control information with the lowest priority among the first uplink control information and the second uplink control information.

(5) The first uplink indication information is the uplink indication information with the earliest sending time among the uplink indication information respectively corresponding to the first uplink control information and the second uplink control information.

(6) The first uplink indication information is the uplink indication information with the latest sending time among the uplink indication information respectively corresponding to the first uplink control information and the second uplink control information.

Hereinafter, three schemes of determining the first resource set will be described:

The first scheme: according to the first load corresponding to the first uplink control information, the first resource set is determined from the resource sets configured by the configuration information corresponding to the first uplink control information.

The second scheme: according to the second load corresponding to the second uplink control information, the first resource set is determined from the resource sets configured by the configuration information corresponding to the second uplink control information.

The third scheme: according to the first load and the first code rate corresponding to the first uplink control information, and the second load and the second code rate corresponding to the second uplink control information, the first resource set is determined from resource sets configured by at least two configuration information.

In some embodiments, the third load is determined according to at least one of the first uplink control information, the second uplink control information, the first load, the first code rate, the second load, and the second code rate, and according to the third load, the first resource set is determined from resource sets configured by at least two configuration information.

In a possible implementation manner, the third load is determined according to a product of a third code rate and a sum of a first ratio and a second ratio.

In the embodiment, the first ratio is a ratio of the first load to the first code rate. The second ratio is a ratio of the second load to the second code rate.

In some other embodiments, according to the third load, determining the first resource set from resource sets of at least two configuration information includes any of the following:

(1) The first resource set is a resource set corresponding to the third load among the resource sets configured by the configuration information corresponding to the first uplink control information.

(2) The first resource set is a resource set corresponding to the third load among the resource sets configured by the configuration information corresponding to the second uplink control information.

(3) The first resource set is a resource set corresponding to the third load among the resource sets configured by configuration information with the highest priority.

(4) The first resource set is a resource set corresponding to the third load among the resource sets configured by configuration information with the lowest priority.

It should be noted that the third code rate is determined according to at least one of the first uplink control information, the second uplink control information, the first load, the first code rate, the second load, and the second code rate, and the determination of the third code rate will be described hereinafter. The third code rate is determined in the following schemes:

The first scheme: the third code rate is determined by the first code rate and the second code rate.

(1) The third code rate is the smallest code rate among the first code rate and the second code rate.

(2) The third code rate is the largest code rate among the first code rate and the second code rate.

(3) The third code rate is the code rate corresponding to the uplink control information with the highest priority.

(4) The third code rate is the code rate corresponding to the uplink control information with the lowest priority.

The second scheme: the third code rate is determined by the first uplink control information.

(1) The third code rate is the code rate corresponding to the resource corresponding to the second uplink indication information in the resource set corresponding to the first load, and the second uplink indication information is the indication information corresponding to the first uplink control information.

(2) The third code rate is the maximum code rate corresponding to the resources in the resource set configured by the configuration information corresponding to the first uplink control information.

(3) The third code rate is the minimum code rate corresponding to the resources in the resource set configured by the configuration information corresponding to the first uplink control information.

(4) The third code rate is the maximum code rate corresponding to the resources in the resource set corresponding to the first load.

(5) The third code rate is the minimum code rate corresponding to the resources in the resource set corresponding to the first load.

It should be noted that the resource set corresponding to the first load in the second scheme is a resource set configured by configuration information corresponding to the first uplink control information.

The third scheme: the third code rate is determined by the second uplink control information.

(1) The third code rate is the code rate corresponding to the resource corresponding to the third uplink indication information in the resource set corresponding to the second load, and the third uplink indication information is the indication information corresponding to the second uplink control information.

(2) The third code rate is the maximum code rate corresponding to the resources in the resource set configured by the configuration information corresponding to the second uplink control information.

(3) The third code rate is the minimum code rate corresponding to the resources in the resource set configured by the configuration information corresponding to the second uplink control information.

(4) The third code rate is the maximum code rate corresponding to the resources in the resource set corresponding to the second load.

(5) The third code rate is the minimum code rate corresponding to the resources in the resource set corresponding to the second load.

It should be noted that, in the fourth manner, the resource set corresponding to the second load is a resource set configured by configuration information corresponding to the second uplink control information.

The fourth scheme: the third code rate is determined by the priority corresponding to the configuration information.

(1) The third code rate is the maximum code rate corresponding to the resources in the resource set configured by the configuration information with the highest priority.

(2) The third code rate is the minimum code rate corresponding to the resources in the resource set configured by the configuration information with the highest priority.

(3) The third code rate is the maximum code rate corresponding to the resources in the resource set configured by the configuration information with the lowest priority.

(4) The third code rate is the minimum code rate corresponding to the resources in the resource set configured by the configuration information with the lowest priority.

It should be noted that in the embodiment of the present application, the first code rate of the first uplink control information and the second code rate of the second uplink control information will also be used. How to determine the first code rate of the first uplink control information and the second code rate of the second uplink control information will be discussed below:

In the embodiment, the first code rate of the first uplink control information is any of the following situations:

(1) The first code rate is the code rate corresponding to the resource corresponding to the second uplink indication information in the resource set corresponding to the first load, and the second uplink indication information is the indication information corresponding to the first uplink control information.

(2) The first code rate is the maximum code rate corresponding to the resources in the resource set configured by the configuration information corresponding to the first uplink control information.

(3) The first code rate is the minimum code rate corresponding to the resources in the resource set configured by the configuration information corresponding to the first uplink control information.

(4) The first code rate is the maximum code rate corresponding to the resources in the resource set corresponding to the first load.

(5) The first code rate is the minimum code rate corresponding to the resources in the resource set corresponding to the first load.

In some embodiments, the second code rate of the second uplink control information is any of the following:

(1) The second code rate is the code rate corresponding to the resource corresponding to the third uplink indication information in the resource set corresponding to the second load, and the third uplink indication information is the indication information corresponding to the second uplink control information.

(2) The second code rate is the maximum code rate corresponding to the resources in the resource set configured by the configuration information corresponding to the second uplink control information.

(3) The second code rate is the minimum code rate corresponding to the resources in the resource set configured by the configuration information corresponding to the second uplink control information.

(4) The second code rate is the maximum code rate corresponding to the resources in the resource set corresponding to the second load.

(5) The second code rate is the minimum code rate corresponding to the resources in the resource set corresponding to the second load.

In this embodiment of the present application, the manner in which the network device determines the first resource is the same as the manner in which the terminal device determines the first resource. Reference is made to step 330 for details, and step 340 will not be described here.

In the method provided by the embodiment of the present application, the resource set configured by the configuration information sent by the network device is used to determine the first resource used to transmit the first uplink control information and the second uplink control information from the resource set, which breaks the limitation that two uplink control information cannot be transmitted when the time domain resources for transmitting the two uplink control information overlap, prevents the loss of services, improves the effect of transmitting uplink control information, and further improves the communication quality.

Figure 6:
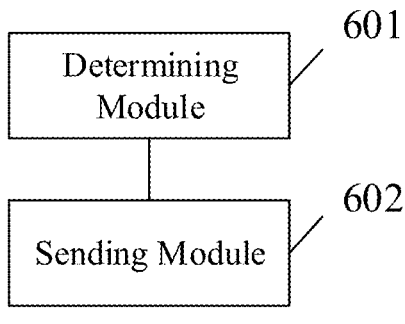
FIG. 6 shows a block diagram of a communication device provided by an exemplary embodiment of the present application.

FIG. 6 shows a block diagram of a communication apparatus provided by an exemplary embodiment of the present application, which is configured in a terminal device, and the apparatus includes:

a determining module 601, configured to determine a first resource according to first uplink control information and/or second uplink control information, wherein a priority of the first uplink control information is different from a priority of the second uplink control information; and a sending module 602, configured to send the first uplink control information and the second uplink control information on the first resource.

Figure 7:
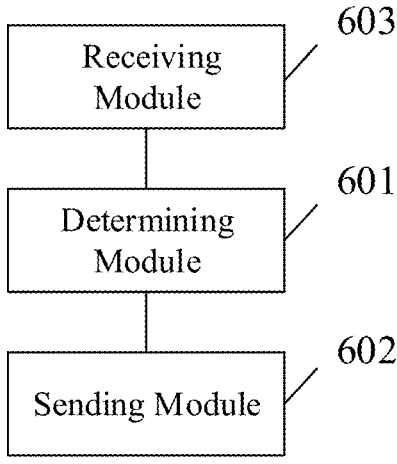
FIG. 7 shows a block diagram of a communication device provided by an exemplary embodiment of the present application.

In some embodiment, referring to FIG. 7, the apparatus further includes:

a receiving module 603, configured to receive at least two configuration information, each configuration information is used to configure at least one resource set, each resource set includes at least one resource; the at least two configuration information respectively correspond to different physical layer priorities;

the determining module 601 is configured to select the first resource from the resource sets configured by the at least two configuration information according to the to be transmitted first uplink control information and/or the second uplink control information.

In some embodiments, the determining module 601 is configured to:

determine a first resource set from the resource sets configured by the at least two configuration information according to the first uplink control information and/or the second uplink control information; and determine that a resource corresponding to the first uplink indication information in the first resource set is the first resource.

In some embodiments, the determining module 601 is configured to:

determine the first resource set from the resource sets configured by the configuration information corresponding to the first uplink control information according to a first load corresponding to the first uplink control information.

In some embodiments, the determining module 601 is configured to determine the first resource set from the resource sets configured by the configuration information corresponding to the second uplink control information according to a second load corresponding to the second uplink control information.

In some embodiments, the determining module 601 is configured to determine the first resource set from the resource sets configured by the at least two configuration information according to a first load and a first code rate corresponding to the first uplink control information and a second load and a second code rate corresponding to the second uplink control information.

In some embodiments, the determining module 601 is configured to determine a third load according to at least one of the first uplink control information, the second uplink control information, the first load, the first code rate, the second load, and the second code rate, the third load is used to determine the first resource set; and determine the first resource set from the resource sets configured by the at least two configuration information according to the third load.

In some embodiments, the third load is determined according to a product of a third code rate and a sum of a first ratio and a second ratio;

the first ratio is a ratio of the first load to the first code rate;

the second ratio is a ratio of the second load to the second code rate; and the third code rate is determined according to at least one of the first uplink control information, the second uplink control information, the first load, the first code rate, the second load, and the second code rate.

In some embodiments, the first resource set is a resource set corresponding to the third load in the resource sets configured by the configuration information corresponding to the first uplink control information; or, the first resource set is a resource set corresponding to the third load in the resource sets configured by the configuration information corresponding to the second uplink control information, or, the first resource set is a resource set corresponding to the third load in the resource sets configured by configuration information with highest priority, or, the first resource set is a resource set corresponding to the third load in the resource sets configured by configuration information with lowest priority.

In some embodiments, the third code rate is a smallest code rate among the first code rate and the second code rate; or, the third code rate is determined by a largest code rate among the first code rate and the second code rate; or, the third code rate is a code rate corresponding to the uplink control information with highest priority; or, the third code rate is a code rate corresponding to the uplink control information with lowest priority.

In some embodiments, the third code rate is a code rate corresponding to a resource corresponding to a second uplink indication information in the resource set corresponding to the first load, and the second uplink indication information is the indication information corresponding to the first uplink control information; or, the third code rate is a maximum code rate corresponding to the resource in the resource set configured by the configuration information corresponding to the first uplink control information; or, the third code rate is a minimum code rate corresponding to the resources in the resource set configured by the configuration information corresponding to the first uplink control information; or, the third code rate is a maximum code rate corresponding to the resources in the resource set corresponding to the first load; or, the third code rate is a minimum code rate corresponding to the resources in the resource set corresponding to the first load;

wherein, the resource set corresponding to the first load is a resource set configured by configuration information corresponding to the first uplink control information.

In some embodiments, the third code rate is a code rate corresponding to a resource corresponding to a third uplink indication information in the resource set corresponding to the second load, and the third uplink indication information is the indication information corresponding to the second uplink control information; or, the third code rate is a maximum code rate corresponding to the resource in the resource set configured by the configuration information corresponding to the second uplink control information; or, the third code rate is a minimum code rate corresponding to the resources in the resource set configured by the configuration information corresponding to the second uplink control information; or, the third code rate is a maximum code rate corresponding to the resources in the resource set corresponding to the second load; or, the third code rate is a minimum code rate corresponding to the resources in the resource set corresponding to the second load;

wherein, the resource set corresponding to the second load is a resource set configured by configuration information corresponding to the second uplink control information.

In some embodiments, the third code rate is a maximum code rate corresponding to the resources in the resource set configured by the configuration information with the highest priority; or, the third code rate is a minimum code rate corresponding to the resources in the resource set configured by the configuration information with the highest priority; or, the third code rate is a maximum code rate corresponding to the resources in the resource set configured by the configuration information with the lowest priority; or, the third code rate is a minimum code rate corresponding to the resources in the resource set configured by the configuration information with the lowest priority.

In some embodiments, the first code rate is a code rate corresponding to a resource corresponding to a second uplink indication information in the resource set corresponding to the first load, and the second uplink indication information is the indication information corresponding to the first uplink control information; or, the first code rate is a maximum code rate corresponding to the resource in the resource set configured by the configuration information corresponding to the first uplink control information; or, the first code rate is a minimum code rate corresponding to the resources in the resource set configured by the configuration information corresponding to the first uplink control information; or, the first code rate is a maximum code rate corresponding to the resources in the resource set corresponding to the first load; or, the first code rate is a minimum code rate corresponding to the resources in the resource set corresponding to the first load;

wherein, the resource set corresponding to the first load is a resource set configured by configuration information corresponding to the first uplink control information.

In some embodiments, the second code rate is a code rate corresponding to a resource corresponding to a third uplink indication information in the resource set corresponding to the second load, and the third uplink indication information is the indication information corresponding to the second uplink control information, or, the second code rate is a maximum code rate corresponding to the resource in the resource set configured by the configuration information corresponding to the second uplink control information; or, the second code rate is a minimum code rate corresponding to the resources in the resource set configured by the configuration information corresponding to the second uplink control information; or, the second code rate is a maximum code rate corresponding to the resources in the resource set corresponding to the second load; or, the second code rate is a minimum code rate corresponding to the resources in the resource set corresponding to the second load;

wherein, the resource set corresponding to the second load is a resource set configured by configuration information corresponding to the second uplink control information.

In some embodiments, the first uplink indication information is uplink indication information corresponding to the first uplink control information; or, the first uplink indication information is uplink indication information corresponding to the second uplink control information; or, the first uplink indication information is uplink indication information corresponding to highest priority uplink control information among the first uplink control information and the second uplink control information; or, the first uplink indication information is uplink indication information corresponding to lowest priority uplink control information among the first uplink control information and the second uplink control information; or, the first uplink indication information is the earliest uplink indication information among the uplink indication information respectively corresponding to the first uplink control information and the second uplink control information; or, the first uplink indication information is the latest uplink indication information among the uplink indication information respectively corresponding to the first uplink control information and the second uplink control information.

Figure 8:
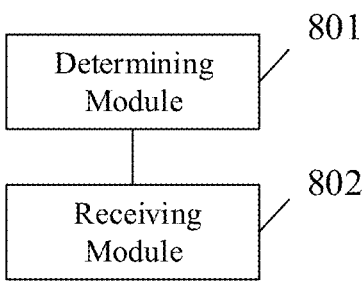
FIG. 8 shows a block diagram of a communication device provided by an exemplary embodiment of the present application.

FIG. 8 shows a block diagram of a communication apparatus provided by an exemplary embodiment of the present application, which is configured in a network device, and the apparatus includes:

a determining module 801, configured to determine a first resource according to first uplink control information and/or second uplink control information, wherein a priority of the first uplink control information is different from a priority of the second uplink control information; and a receiving module 802, configured to receive the first uplink control information and the second uplink control information on the first resource.

Figure 9:
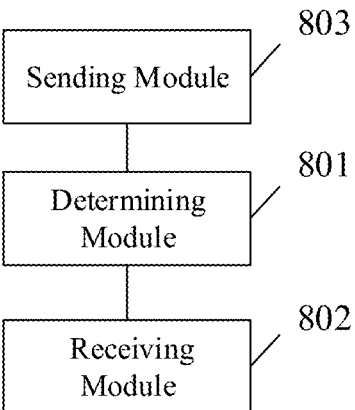
FIG. 9 shows a block diagram of a communication device provided by an exemplary embodiment of the present application.

In some embodiments, referring to FIG. 9, the apparatus further includes:

a sending module 803, configured to send at least two configuration information, each configuration information is used to configure at least one resource set, each resource set includes at least one resource; the at least two configuration information respectively correspond to different physical layer priorities;

the determining module 801 is configured to determine the first resource from the resource sets configured by the at least two configuration information according to the to be received first uplink control information and/or the second uplink control information.

In some embodiments, the determining module 801 is configured to:

determine a first resource set from the resource sets configured by the at least two configuration information according to the first uplink control information and/or the second uplink control information; and determine that a resource corresponding to the first uplink indication information in the first resource set is the first resource.

In some embodiments, the determining module 801 is configured to determine the first resource set from the resource sets configured by the configuration information corresponding to the first uplink control information according to a first load corresponding to the first uplink control information.

In some embodiments, the determining module 801 is configured to determine the first resource set from the resource sets configured by the configuration information corresponding to the second uplink control information according to a second load corresponding to the second uplink control information.

In some embodiments, the determining module 801 is configured to determine the first resource set from the resource sets configured by the at least two configuration information according to a first load and a first code rate corresponding to the first uplink control information and a second load and a second code rate corresponding to the second uplink control information.

In some embodiments, the determining module 801 is configured to:

determine a third load according to at least one of the first uplink control information, the second uplink control information, the first load, the first code rate, the second load, and the second code rate, wherein the third load is used to determine the first resource set; and determine the first resource set from the resource sets configured by the at least two configuration information according to the third load.

In some embodiments, the third load is determined according to a product of a third code rate and a sum of a first ratio and a second ratio;

the first ratio is a ratio of the first load to the first code rate;

the second ratio is a ratio of the second load to the second code rate; and the third code rate is determined according to at least one of the first uplink control information, the second uplink control information, the first load, the first code rate, the second load, and the second code rate.

In some embodiments, determining the first resource set according to the third load includes at least one of:

the first resource set is a resource set corresponding to the third load in the resource sets configured by the configuration information corresponding to the first uplink control information; or, the first resource set is a resource set corresponding to the third load in the resource sets configured by the configuration information corresponding to the second uplink control information; or, the first resource set is a resource set corresponding to the third load in the resource sets configured by configuration information with highest priority; or, the first resource set is a resource set corresponding to the third load in the resource sets configured by configuration information with lowest priority.

In some embodiments, the third code rate is a smallest code rate among the first code rate and the second code rate; or, the third code rate is determined by a largest code rate among the first code rate and the second code rate; or, the third code rate is a code rate corresponding to the uplink control information with highest priority; or, the third code rate is a code rate corresponding to the uplink control information with lowest priority.

In some embodiments, the third code rate is a code rate corresponding to a resource corresponding to a second uplink indication information in the resource set corresponding to the first load, and the second uplink indication information is the indication information corresponding to the first uplink control information; or, the third code rate is a maximum code rate corresponding to the resource in the resource set configured by the configuration information corresponding to the first uplink control information; or, the third code rate is a minimum code rate corresponding to the resources in the resource set configured by the configuration information corresponding to the first uplink control information; or, the third code rate is a maximum code rate corresponding to the resources in the resource set corresponding to the first load; or, the third code rate is a minimum code rate corresponding to the resources in the resource set corresponding to the first load;

wherein, the resource set corresponding to the first load is a resource set configured by configuration information corresponding to the first uplink control information.

In some embodiments, the third code rate is a code rate corresponding to a resource corresponding to a third uplink indication information in the resource set corresponding to the second load, and the third uplink indication information is the indication information corresponding to the second uplink control information; or, the third code rate is a maximum code rate corresponding to the resource in the resource set configured by the configuration information corresponding to the second uplink control information; or, the third code rate is a minimum code rate corresponding to the resources in the resource set configured by the configuration information corresponding to the second uplink control information; or, the third code rate is a maximum code rate corresponding to the resources in the resource set corresponding to the second load; or, the third code rate is a minimum code rate corresponding to the resources in the resource set corresponding to the second load;

wherein, the resource set corresponding to the second load is a resource set configured by configuration information corresponding to the second uplink control information.

In some embodiments, the third code rate is a maximum code rate corresponding to the resources in the resource set configured by the configuration information with the highest priority; or, the third code rate is a minimum code rate corresponding to the resources in the resource set configured by the configuration information with the highest priority; or, the third code rate is a maximum code rate corresponding to the resources in the resource set configured by the configuration information with the lowest priority; or, the third code rate is a minimum code rate corresponding to the resources in the resource set configured by the configuration information with the lowest priority.

In some embodiments, the first code rate is a code rate corresponding to a resource corresponding to a second uplink indication information in the resource set corresponding to the first load, and the second uplink indication information is the indication information corresponding to the first uplink control information; or, the first code rate is a maximum code rate corresponding to the resource in the resource set configured by the configuration information corresponding to the first uplink control information; or, the first code rate is a minimum code rate corresponding to the resources in the resource set configured by the configuration information corresponding to the first uplink control information; or, the first code rate is a maximum code rate corresponding to the resources in the resource set corresponding to the first load; or, the first code rate is a minimum code rate corresponding to the resources in the resource set corresponding to the first load;

wherein, the resource set corresponding to the first load is a resource set configured by configuration information corresponding to the first uplink control information.

In some embodiments, the second code rate is a code rate corresponding to a resource corresponding to a third uplink indication information in the resource set corresponding to the second load, and the third uplink indication information is the indication information corresponding to the second uplink control information; or, the second code rate is a maximum code rate corresponding to the resource in the resource set configured by the configuration information corresponding to the second uplink control information; or, the second code rate is a minimum code rate corresponding to the resources in the resource set configured by the configuration information corresponding to the second uplink control information; or, the second code rate is a maximum code rate corresponding to the resources in the resource set corresponding to the second load; or, the second code rate is a minimum code rate corresponding to the resources in the resource set corresponding to the second load;

wherein, the resource set corresponding to the second load is a resource set configured by configuration information corresponding to the second uplink control information.

In some embodiments, the first uplink indication information is uplink indication information corresponding to the first uplink control information; or, the first uplink indication information is uplink indication information corresponding to the second uplink control information; or, the first uplink indication information is uplink indication information corresponding to highest priority uplink control information among the first uplink control information and the second uplink control information; or, the first uplink indication information is uplink indication information corresponding to lowest priority uplink control information among the first uplink control information and the second uplink control information; or, the first uplink indication information is the earliest uplink indication information among the uplink indication information respectively corresponding to the first uplink control information and the second uplink control information; or, the first uplink indication information is the latest uplink indication information among the uplink indication information respectively corresponding to the first uplink control information and the second uplink control information.

Figure 10:
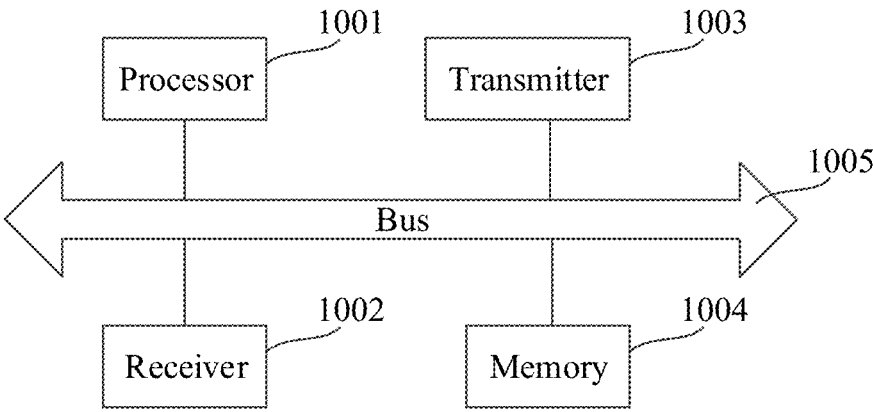
FIG. 10 shows a schematic structural diagram of a communication device provided by an exemplary embodiment of the present application.

FIG. 10 shows a schematic structural diagram of a communication device (first device or second device) provided by an exemplary embodiment of the present application, the communication device includes: a processor 1001, a receiver 1002, a transmitter 1003, a memory 1004 and a bus 1005.

The processor 1001 includes one or more processing cores, and the processor 1001 executes various functional applications and information processing by running software programs and modules.

The receiver 1002 and the transmitter 1003 can be realized as one communication component, and the communication component can be a communication chip.

The memory 1004 is connected to the processor 1001 through a bus 1005.

The memory 1004 may be used to store at least one instruction, and the processor 1001 is used to execute the at least one instruction, so as to implement various steps in the foregoing method embodiments.

In addition, the memory 1004 can be realized by any type of volatile or non-volatile storage device or their combination, volatile or non-volatile storage devices include but not limited to: magnetic disk or optical disk, electrically erasable and programmable read only memory (EEPROM), erasable and programmable read only memory (EPROM), static random-access memory (SRAM), read only memory (ROM), magnetic memory, flash memory, and programmable read only memory (PROM).

In an exemplary embodiment, a computer-readable storage medium is also provided, and executable program code is stored in the readable storage medium, and the executable program code is loaded and executed by a processor to implement the resource determination method performed by the terminal device or the network device provided by the above-mentioned various method embodiments.

In an exemplary embodiment, a chip is also provided, the chip includes a programmable logic circuit and/or program instructions, and when the chip is run on a terminal device or a network device, it is used to implement the resource determination method as described above.

In an exemplary embodiment, a computer program product is also provided, which is used to implement the resource determination method above when the computer program product is executed by a processor of a terminal device or a network device.

Those of ordinary skill in the art can understand that all or part of the steps for implementing the above-mentioned embodiments can be completed by hardware, or can be completed by instructing related hardware through a program, and the program can be stored in a computer-readable storage medium. The above storage medium can be read-only memory, magnetic disk or optical disk and so on.

The above are only optional embodiments of the application, and are not intended to limit the application. Any modifications, equivalent replacements, improvements, etc. made within the spirit and principles of the application shall be included in the protection scope of the application.

What is claimed is:

1. A method for determining resource, applied to a terminal device, the method comprising:

determining a first resource according to first uplink control information and/or second uplink control information, wherein a priority of the first uplink control information is different from a priority of the second uplink control information; and sending the first uplink control information and the second uplink control information on the first resource;

wherein the method further comprises:

receiving at least two configuration information, wherein each configuration information is used to configure at least one resource set, each resource set comprises at least one resource, and the at least two configuration information respectively correspond to different physical layer priorities;

wherein determining the first resource according to the first uplink control information and/or the second uplink control information comprises:

determining the first resource from the resource sets configured by the at least two configuration information according to the first uplink control information and/or the second uplink control information;

wherein determining the first resource from the resource sets configured by the at least two configuration information according to the first uplink control information and/or the second uplink control information comprises:

determining a first resource set from the resource sets configured by the at least two configuration information according to the first uplink control information and/or the second uplink control information; and determining that a resource corresponding to the first uplink control information in the first resource set is the first resource;

wherein determining the first resource set from the resource sets configured by the at least two configuration information according to the first uplink control information and/or the second uplink control information comprises:

determining the first resource set from the resource sets configured by the at least two configuration information according to a first load and a first code rate corresponding to the first uplink control information and a second load and a second code rate corresponding to the second uplink control information;

wherein determining the first resource set from the resource sets configured by the at least two configuration information according to the first load and the first code rate corresponding to the first uplink control information and the second load and the second code rate corresponding to the second uplink control information comprises:

determining a third load according to at least one of the first load, the first code rate, the second load, and the second code rate; and determining the first resource set from the resource sets configured by the at least two configuration information according to the third load; and wherein the third load is determined according to a product of a third code rate and a sum of a first ratio and a second ratio, the first ratio is a ratio of the first load to the first code rate, and the second ratio is a ratio of the second load to the second code rate.

2. The method according to claim 1, wherein determining the first resource set from the resource sets configured by the at least two configuration information according to the first uplink control information and/or the second uplink control information further comprises:

determining the first resource set from the resource sets configured by the configuration information corresponding to the first uplink control information according to a first load corresponding to the first uplink control information; or determining the first resource set from the resource sets configured by the configuration information corresponding to the second uplink control information according to a second load corresponding to the second uplink control information.

3. The method according to claim 1, wherein one of the following:

the first resource set is a resource set corresponding to the third load in the resource sets configured by the configuration information corresponding to the first uplink control information;

the first resource set is a resource set corresponding to the third load in the resource sets configured by the configuration information corresponding to the second uplink control information;

the first resource set is a resource set corresponding to the third load in the resource sets configured by configuration information with highest priority; and the first resource set is a resource set corresponding to the third load in the resource sets configured by configuration information with lowest priority.

4. A network device, comprising:

a processor;

a transceiver connected to the processor; and a memory for storing a program code executable by the processor;

wherein the processor is configured to load and execute the executable program code to:

determine a first resource according to first uplink control information and/or second uplink control information, wherein a priority of the first uplink control information is different from a priority of the second uplink control information; and receive the first uplink control information and the second uplink control information on the first resource;

wherein the processor is further configured to load and execute the executable program code to:

send at least two configuration information, wherein each configuration information is used to configure at least one resource set, each resource set comprises at least one resource, and the at least two configuration information respectively correspond to different physical layer priorities; and determine the first resource from the resource sets configured by the at least two configuration information according to the first uplink control information and/or the second uplink control information;

wherein the processor is further configured to load and execute the executable program code to:

determine a first resource set from the resource sets configured by the at least two configuration information according to the first uplink control information and/or the second uplink control information;

determine that a resource corresponding to the first uplink control information in the first resource set is the first resource;

determine the first resource set from the resource sets configured by the at least two configuration information according to a first load and a first code rate corresponding to the first uplink control information and a second load and a second code rate corresponding to the second uplink control information;

determine a third load according to at least one of the first load, the first code rate, the second load, and the second code rate, wherein the third load is used to determine the first resource set; and determine the first resource set from the resource sets configured by the at least two configuration information according to the third load;

wherein the third load is determined according to a product of a third code rate and a sum of a first ratio and a second ratio, the first ratio is a ratio of the first load to the first code rate, and the second ratio is a ratio of the second load to the second code rate.

5. The network device according to claim 4, wherein one of the following:

the first resource set is a resource set corresponding to the third load in the resource sets configured by the configuration information corresponding to the first uplink control information;

the first resource set is a resource set corresponding to the third load in the resource sets configured by the configuration information corresponding to the second uplink control information;

the first resource set is a resource set corresponding to the third load in the resource sets configured by configuration information with highest priority; and the first resource set is a resource set corresponding to the third load in the resource sets configured by configuration information with lowest priority.

6. A terminal device, comprising:

a processor;

a transceiver connected to the processor; and a memory for storing a program code executable by the processor;

wherein the processor is configured to load and execute the executable program code to:

determine a first resource according to first uplink control information and/or second uplink control information, wherein a priority of the first uplink control information is different from a priority of the second uplink control information; and send the first uplink control information and the second uplink control information on the first resource;

wherein the processor is further configured to load and execute the executable program code to:

receive at least two configuration information, wherein each configuration information is used to configure at least one resource set, each resource set comprises at least one resource, and the at least two configuration information respectively correspond to different physical layer priorities; and determine the first resource from the resource sets configured by the at least two configuration information according to the first uplink control information and/or the second uplink control information;

wherein the processor is further configured to load and execute the executable program code to:

determine a first resource set from the resource sets configured by the at least two configuration information according to the first uplink control information and/or the second uplink control information;

determine that a resource corresponding to the first uplink control information in the first resource set is the first resource;

determine the first resource set from the resource sets configured by the at least two configuration information according to a first load and a first code rate corresponding to the first uplink control information and a second load and a second code rate corresponding to the second uplink control information;

determine a third load according to at least one of the first load, the first code rate, the second load, and the second code rate, wherein the third load is used to determine the first resource set; and determine the first resource set from the resource sets configured by the at least two configuration information according to the third load;

wherein the third load is determined according to a product of a third code rate and a sum of a first ratio and a second ratio, the first ratio is a ratio of the first load to the first code rate, and the second ratio is a ratio of the second load to the second code rate.

7. The terminal device according to claim 6, wherein the processor is further configured to load and execute the executable program code to:

determine the first resource set from the resource sets configured by the configuration information corresponding to the first uplink control information according to a first load corresponding to the first uplink control information; or determine the first resource set from the resource sets configured by the configuration information corresponding to the second uplink control information according to a second load corresponding to the second uplink control information.

8. The terminal device according to claim 6, wherein one of the following:

the first resource set is a resource set corresponding to the third load in the resource sets configured by the configuration information corresponding to the first uplink control information;

the first resource set is a resource set corresponding to the third load in the resource sets configured by the configuration information corresponding to the second uplink control information;

the first resource set is a resource set corresponding to the third load in the resource sets configured by configuration information with highest priority; and the first resource set is a resource set corresponding to the third load in the resource sets configured by configuration information with lowest priority.

* * * * *